(12) United States Patent
Verpooten

(10) Patent No.: US 9,226,165 B2
(45) Date of Patent: Dec. 29, 2015

(54) METHOD FOR ASSESSING QUALITY OF A RADIO TRANSMISSION CHANNEL, AND RESIDENTIAL GATEWAY USING THE METHOD

(71) Applicant: Thomson Licensing, Issy de Moulineaux (FR)

(72) Inventor: Luc Verpooten, Edegem (BE)

(73) Assignee: Thomson Licensing, Issy-les-Moulineaux (FR)

( * ) Notice: Subject to any disclaimer, the term of this patent is extended or adjusted under 35 U.S.C. 154(b) by 69 days.

(21) Appl. No.: 13/773,528

(22) Filed: Feb. 21, 2013

(65) Prior Publication Data
US 2013/0215776 A1 Aug. 22, 2013

(30) Foreign Application Priority Data
Feb. 21, 2012 (EP) ..................................... 12305191

(51) Int. Cl.
| | | |
|---|---|---|
| H04W 24/02 | (2009.01) | |
| H04W 24/00 | (2009.01) | |
| H04L 1/18 | (2006.01) | |
| H04L 1/20 | (2006.01) | |
| H04W 36/20 | (2009.01) | |
| H04W 36/30 | (2009.01) | |

(52) U.S. Cl.
CPC .................. *H04W 24/00* (2013.01); *H04L 1/18* (2013.01); *H04L 1/20* (2013.01); *H04W 36/20* (2013.01); *H04W 36/30* (2013.01)

(58) Field of Classification Search
None
See application file for complete search history.

(56) References Cited

U.S. PATENT DOCUMENTS

| | | | | |
|---|---|---|---|---|
| 5,566,340 | A * | 10/1996 | Stewart et al. | 713/323 |
| 6,571,103 | B1 * | 5/2003 | Novakov | 455/464 |
| 6,727,816 | B1 * | 4/2004 | Helgeson | 340/540 |
| 7,400,604 | B2 | 7/2008 | Lee et al. | |
| 7,570,656 | B2 * | 8/2009 | Raphaeli et al. | 370/445 |
| 8,181,080 | B2 * | 5/2012 | Jugl et al. | 714/749 |
| 8,462,758 | B2 * | 6/2013 | Yin et al. | 370/344 |
| 8,694,045 | B2 * | 4/2014 | Tsuruoka | 455/522 |
| 2003/0087662 | A1 | 5/2003 | Miyoshi et al. | |
| 2003/0112880 | A1 * | 6/2003 | Walton et al. | 375/260 |

(Continued)

FOREIGN PATENT DOCUMENTS

| | | |
|---|---|---|
| CN | 101044768 A | 9/2007 |
| KR | 10-2007-0027794 A | 3/2007 |

(Continued)

OTHER PUBLICATIONS

European Search Report dated May 7, 2012.

(Continued)

*Primary Examiner* — Bunjob Jaroenchonwanit
(74) *Attorney, Agent, or Firm* — Myers Wolin LLC

(57) ABSTRACT

A method for assessing quality of a transmission channel in a wireless network comprises the steps of
a) a first station transmitting a first unicast message to a second station by said transmission channel;
b) if no acknowledgement of the first unicast message is received from the second station, the first station transmitting a further unicast message at a higher power level, and
c) if an acknowledgment of the first or any further unicast message is received from the second station, assessing the quality of the transmission channel based on the power level or the number of transmissions that were needed to trigger the acknowledgment.

16 Claims, 2 Drawing Sheets

(56) References Cited

U.S. PATENT DOCUMENTS

| | | | |
|---|---|---|---|
| 2003/0223452 A1* | 12/2003 | Toskala et al. | 370/442 |
| 2004/0059825 A1* | 3/2004 | Edwards et al. | 709/230 |
| 2005/0141468 A1 | 6/2005 | Kim et al. | |
| 2006/0092466 A1* | 5/2006 | Ikeda | 358/1.15 |
| 2006/0215559 A1* | 9/2006 | Mese et al. | 370/232 |
| 2006/0253488 A1* | 11/2006 | Akaiwa | 707/102 |
| 2006/0285527 A1* | 12/2006 | Gao et al. | 370/338 |
| 2008/0031209 A1* | 2/2008 | Abhishek et al. | 370/338 |
| 2008/0056211 A1* | 3/2008 | Kim et al. | 370/338 |
| 2008/0064404 A1* | 3/2008 | Zhang et al. | 455/436 |
| 2008/0096501 A1* | 4/2008 | Salomone et al. | 455/161.1 |
| 2008/0225809 A1* | 9/2008 | Guo | 370/338 |
| 2008/0259861 A1* | 10/2008 | Kang et al. | 370/329 |
| 2009/0052382 A1 | 2/2009 | Stephenson et al. | |
| 2009/0092082 A1* | 4/2009 | Twitchell, Jr. | 370/328 |
| 2009/0135785 A1* | 5/2009 | Fiat et al. | 370/332 |
| 2010/0069037 A1* | 3/2010 | Fischer et al. | 455/410 |
| 2010/0091715 A1* | 4/2010 | Akchurin et al. | 370/329 |
| 2011/0106956 A1* | 5/2011 | Luo et al. | 709/228 |
| 2011/0142014 A1* | 6/2011 | Banerjee et al. | 370/338 |
| 2011/0164514 A1* | 7/2011 | Afkhamie et al. | 370/252 |
| 2012/0087255 A1* | 4/2012 | Ukita et al. | 370/252 |
| 2012/0155350 A1* | 6/2012 | Wentink et al. | 370/311 |
| 2012/0188894 A1* | 7/2012 | Huschke et al. | 370/252 |
| 2012/0287783 A1* | 11/2012 | Kuhn et al. | 370/230 |
| 2013/0155933 A1* | 6/2013 | Kneckt et al. | 370/312 |
| 2013/0225172 A1* | 8/2013 | Singh et al. | 455/436 |
| 2013/0331031 A1* | 12/2013 | Palin et al. | 455/41.2 |
| 2014/0092800 A1* | 4/2014 | Cho et al. | 370/311 |
| 2014/0194062 A1* | 7/2014 | Palin et al. | 455/41.2 |
| 2014/0204933 A1 | 7/2014 | Roy et al. | |
| 2014/0219216 A1* | 8/2014 | Lee et al. | 370/329 |
| 2014/0269463 A1* | 9/2014 | Miryala et al. | 370/311 |

FOREIGN PATENT DOCUMENTS

| | | |
|---|---|---|
| WO | 2006/093634 A1 | 9/2006 |
| WO | WO2009127055 | 10/2009 |
| WO | WO2011085187 | 7/2011 |

OTHER PUBLICATIONS

Athanasiou et al., "An 802.11k Compliant Framework for Cooperative Handoff in Wireless Networks", EURASIP Journal on Wireless Communications and Networking 2009, 2009:350643, Sep. 6, 2009.

Chen et al., "Observations on Using Simulated Annealing for Dynamic Channel Allocation in 802.11 WLANs", IEEE Copyright 2008, pp. 1801-1805.

Gurpal Singh et al., "Effect of background scan on performance of neighbouring channels in 802.11 networks", Int. J. Communication Networks and Distributed Systems, vol. 1, No. 1, 2008, p. 19.

Hong Yoon et al., "Performance of an Active Channel Scanning Scheme for Fast Handover in Mobile Wireless LAN Systems", Journal of Institute of Electronics Engineers of Korea, vol. 43, No. 11, Nov. 2006.

King et al., "Overhearing the Wireless Interface for 802.11-based Positioning Systems", IEEE Computer Society, Proceedings of the Fifth Annual IEEE International Conference on Pervasive Computing and Communications (PerCom'07), IEEE Copyright 2007.

Zhang et al., "Performance Enhancement for Mobility Management in Wireless LANs", WCNC 2008 proceedings, IEEE Copyright 2008, pp. 1757-1762.

\* cited by examiner

METHOD FOR ASSESSING QUALITY OF A RADIO TRANSMISSION CHANNEL, AND RESIDENTIAL GATEWAY USING THE METHOD

This application claims the benefit, under 35 U.S.C. §119 of EP Patent Application 12305191.4, filed 21 Feb. 2012.

TECHNICAL FIELD

The present invention relates to a method for assessing the quality of a transmission channel in a wireless data transmission network.

BACKGROUND OF THE INVENTION

A widely used type of such a network is defined in IEEE standards 802.11. In a network of this type, stations support a plurality of transmission channels, one of which must be selected for communication between the stations when the network is starting up. The available transmission quality can differ from one channel to the other, for various reasons. For example, a channel may be occupied already by stations of another network, it may carry noise from non-network sources, signal attenuation may be high due to destructive interference of multiple propagation paths, etc. Conventionally, a station determines a suitable channel for network communication based on a scan in which energy levels of all supported channels are detected. A channel may then be found suitable for network communication if the level of noise from other sources on that channel is below a predetermined threshold or if it is lower than that of the other channels.

Such an approach may be fast and simple to implement, but is not always satisfying, since a sufficiently noise-free channel is not always available, and the least noisy one of the channels is not always the one that provides best communication quality. In order to allow a choice between a plurality of more or less noisy channels, it has been suggested to detect certain spectral characteristics of the noise in the channels, and to decide, based on said characteristics, whether or to what degree the noise is likely to be detrimental to network communication. Implementation of such methods tends to be expensive, since detection of the spectral characteristics requires specific circuitry which increases the costs of the stations that carry out such methods. Further, there seems to be no spectral characteristic or set of characteristics available by which it could be judged reliably whether or to what extent a certain profile of noise that is present on a channel is detrimental to network communication.

It is therefore desirable to provide a method for assessing quality of a transmission channel in a wireless network which is easy to implement and requires, if at all, only a minimum of dedicated hardware.

SUMMARY OF THE INVENTION

The method for assessing quality of a transmission channel in a wireless network comprises the steps of
a) a first station transmitting a first unicast message to a second station by the transmission channel to be assessed;
b) if no acknowledgement of the first unicast message is received from the second station, the first station transmitting a further unicast message at a higher power level, and
c) if an acknowledgement of the first or any further unicast message is received from the second station, assessing the quality of the transmission channel based on the power level or the number of re-transmissions that were needed to trigger the acknowledgement.

Since the method uses network messages for assessing the channel quality, the result of the assessment is not exclusively dependent on the power level of the noise present in the channel, but is automatically weighted by the degree of compatibility of the noise with the network messages, without a need to determine which spectral characteristics of the noise might be related to its compatibility nor to provide dedicated hardware for detection of these spectral characteristics. The only technical feature of the first station which is necessary for carrying out the method of the invention and which may not be needed for network communication once a channel has been selected is the capability to modify the power level at which the first unicast message is transmitted.

The method of the invention is ideally applicable in a wireless network of the IEEE 802.11 type.

In such a network, the first unicast message may be a probe response message, as is conventionally transmitted by a first station of an IEEE 802.11 network when it has received a probe request message from a second station. The probe request message is conventionally transmitted by a second station in a procedure known as active scanning, which is used by a second station that wishes to connect to an IEEE 802.11 network for identifying an existing network and finding out which of the available transmission channels this network is using.

Since the first station needs to assess the quality of a transmission channel only if there is a second station wishing to connect, step a) of the above method may be triggered by the second station transmitting a probe request message.

In step b), re-transmission is effected in particular if no acknowledgement from the second station has been received within a predetermined delay of the transmission of the first unicast message.

Preferably, the first station is an access point of the IEEE 802.11 network. Since one access point may have several second stations associated to it, all these first and second stations may benefit from the method of the invention although only one station is adapted to carry it out. This makes the method of the invention very easy and economic to implement.

When the quality assessment as described above has been carried out successfully for a plurality of channels, the channel which scores the best quality should be identified in a further method step d), and this channel should be used for a subsequent step e) of transmitting messages from said first station to said second station, and, if the channel is bi-directional, also from second to first station.

For a reliable assessment of transmission quality, the power level at which the unicast message is transmitted in step a) should be less than the power level at which messages are later transmitted in step e). The quality of transmission channels can be compared only if at least one transmission error is observed in at least one of them, and by transmitting the unicast message at a low power level, the probability of transmission errors can be increased to such an extent that an error is likely to occur even in a single short message.

Even when the best channel has been selected and has been used for transmitting messages in step e) for some time, it may be appropriate to repeat the above-described method in order to account for changes of transmission quality which may have occurred in the meantime. Such a repetition may be carried out at regular intervals, or it may be triggered by a second station which, attempting to associate to the network, transmits a probe request.

In an IEEE 802.11 network, probe requests and probe responses comprise station identifier information which is specific to the station transmitting it. If the first station included its standard station identifier information, also referred to as SSID, in probe response messages transmitted in steps a) and b), second stations associated to the network of that first station might conclude from the low power at which these messages are received that channel quality has deteriorated, and might therefore unnecessarily try to associate to another network in their vicinity. In order to avoid this, the first station should preferably include in the messages it transmits in steps a) and b) alias station identifier information which is different from the standard station identifier information it includes in messages transmitted in step e).

Still, receipt of a message from the first station comprising the alias station identifier information may trigger a request for association from a second station. Such a request should be rejected by the first station, since when it has finished assessing the quality of a given channel, it will stop using the alias station identifier information, so that if the second station tried to send payload messages to a station identified by the alias station identifier information, these messages would be lost.

If the network comprises a plurality of second stations, it is appropriate to carry out steps a) to c) above for each second station and for each transmission channel, respectively. A quality assessment thus obtained for each transmission channel may be improved if for each transmission channel the number of second stations having communicated with the first station is established and, if there is a channel on which not all second stations have been able to communicate, the assessed quality of that transmission channel is reduced accordingly.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
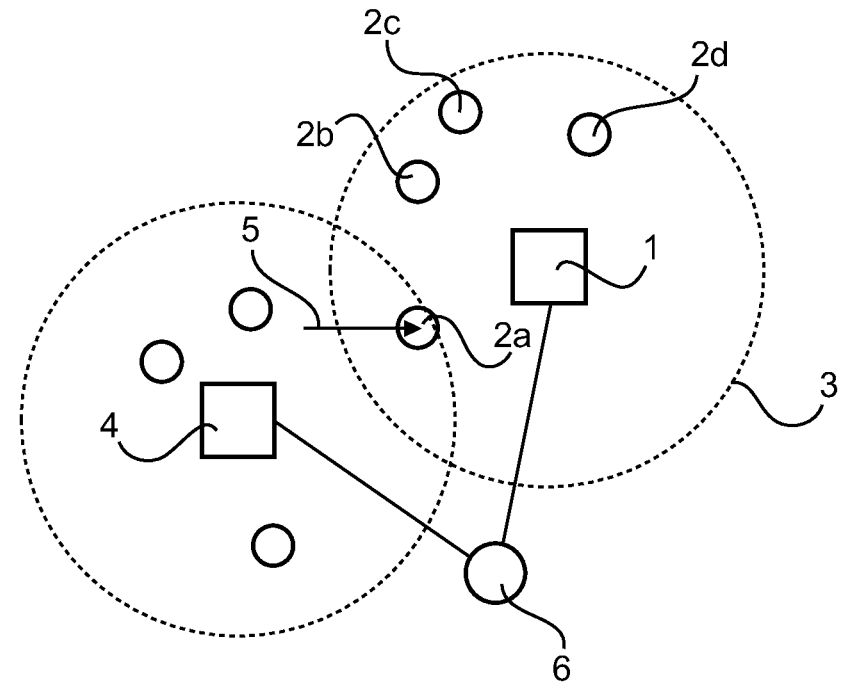
FIG. 1 is a block diagram of a wireless transmission system in which the present invention is implemented, and its operating environment.

FIG. 1 is a very schematical illustration of an IEEE 802.11 wireless network in which the present invention is implemented. In FIG. 1, the network comprises a single access point 1, for example a residential gateway, and a plurality of client stations 2a to 2d. Access point 1 and client stations 2a to 2d support a plurality of wireless communication channels, and access point 1 is using one of these channels for communication with the client stations associated to it. Access point 1 thus provides to its associated client stations access to a wired network 6 such as the Internet, and manages communication between these client stations. A given client station can associate to the wireless network only if it is within the radio transmission range 3 of access point 1, represented in FIG. 1 by a dashed circle.

In a wireless network of the IEEE 802.11 type, many of the client stations are mobile, and transmission quality between any one of client stations and its associated access point may vary when the client station moves. For example in FIG. 1, client station 2a is not only within range 3 of access point 1, but also within that of another access point 4, so that at the location shown in FIG. 1, client station 2a might choose whether to associate to the network of access point 1 or to that of access point 4. If station 2a has moved to its present location from a position outside range 3, as indicated by arrow 5, it is likely that station 2a is currently associated to access point 4, and since it is approaching a border of the range of access point 4, the quality of communication with access point 4 is deteriorating.

In such a situation, in order to identify another access point by which connection to the wired network 6 can be maintained, station 2a needs to find out whether there are any other access points within its transmission range to which it might associate. To this effect, according to IEEE 802.11 two methods are available.

According to the first, referred to as passive scanning, client station 2a tunes to a channel of interest and listens for some time whether it receives a beacon signal. Under IEEE 802.11, beacon signals are periodically transmitted by access points on those channels on which they provide service. Since a waiting time station 2a needs to spend on each channel must at least be as long as the period of the beacon signal, this method tends to be rather slow.

Therefore, according to the second method, referred to as active scanning, station 2a transmits a broadcast probe request and waits for a time shorter than the period of the beacon signal whether a probe response is received from any access point, i.e. 1 or 4. The probe response conventionally comprises station identifier information SSID of the access point from which it originates, so that when client station 2a has received a probe response from a given access point, it can address a unicast message to that access point requesting association to the access point's network using the SSID received in the probe response.

Both passive and active scanning require that an access point is operating and has selected a channel on which it transmits at least the beacon signal, and eventually, probe response messages. However, when the access point 1 is starting up in an environment where other access points such as 4 are operating already, occupying at least some of the transmission channels available under IEEE 802.11, and where other sources of radio noise might be present, access point 1 needs to decide which one of the available channels provides best communication quality. In the following, a method for making this decision will be described.

Figure 2:
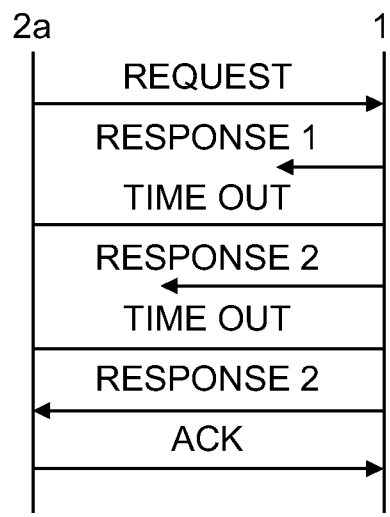
FIG. 2 is a diagram of messages exchanged between stations of the network of FIG. 1.

The method relies on an exchange of messages, schematically illustrated in FIG. 2, between access point 1 and any of the client stations 2 in its range 3. Access point 1 has tuned to a given one of the various channels supported by it and is listening to this channel. In the course of an active scanning procedure, a client station, e.g. station 2a, transmits a probe request message, labelled "REQUEST", on that same channel. Access point 1 receives the message and transmits a probe response message, "RESPONSE 1", at a power level which is substantially less than the one it will later be using for communication with client stations within its range 3, after the network has been properly set up. If the station 2a carrying out the active scan is not very close to access point 1, it will not receive "RESPONSE 1". If the access point 1 does not receive any response from the station 2a within a specified time interval, a timeout is generated in the access point 1, and the access point 1 transmits a probe response message "RESPONSE 2" at a predetermined power level which is higher than that of "RESPONSE 1". In the example of FIG. 2, the power level of "RESPONSE 2" is still not sufficient to reach station 2a. The station 2a therefore does not receive any response, in particular no acknowledgement, to "RESPONSE 2" from the access point 1 within the specified time interval. In a further step, the access point 1 transmits then a "RESPONSE 3" message at a still higher power level, which is finally sufficient to be received by client station 2a and to cause client station 2a to transmit an acknowledgement to access point 1. The number of responses transmitted by access point 1 before receiving an acknowledgement is directly representative of the transmission quality of the active channel.

Figure 3:
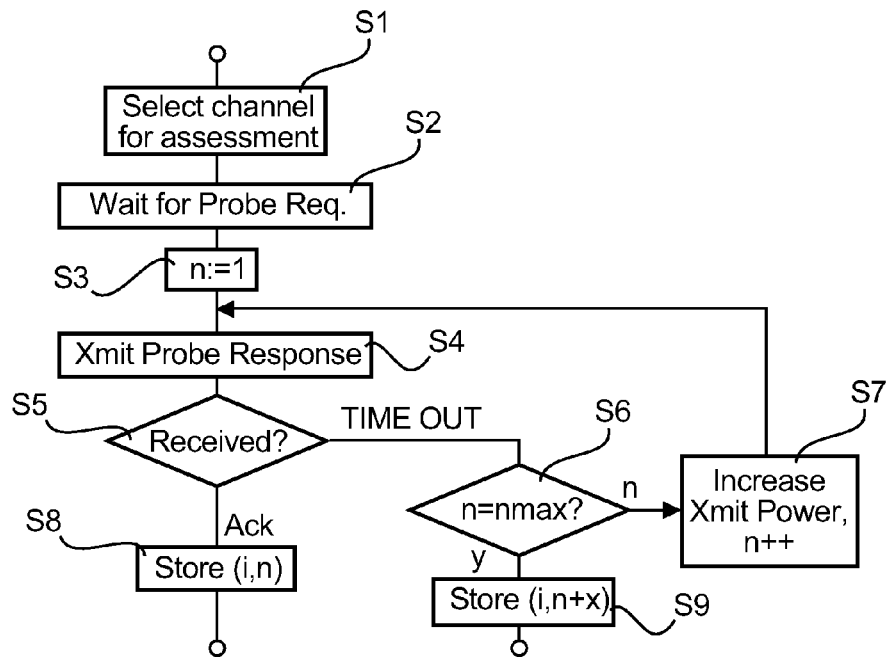
FIG. 3 is a flowchart of a method for assessing the quality of a transmission channel between two stations of the network of FIG. 1.

FIG. 3 is a flowchart of processing steps carried out within access point 1 in conjunction with the exchange of messages shown in FIG. 2. In a first processing step S1, access point 1 selects a channel, the quality of which is to be assessed. In step S2, it waits for probe requests on the selected channel. If none is received within a predetermined waiting time, the procedure may be aborted, and another channel selected. When a probe request is received in step S2, a repetition counter n is set to 1 in step S3, and in step S4, a probe response at a low power level is transmitted to the client station, e.g. station 2a, that issued the probe request. Access point 1 then waits for an acknowledgement from the requesting client station 2a. If the access point 1 does not receive an acknowledgement from the station 2a within a specified time interval, step S5, a timeout is generated and the access point 1 checks in step S6 whether the repetition counter n has reached a predetermined maximum count nmax. If not, the repetition counter n is incremented and the transmission power is increased, step S7. In a further step, the method returns to S4, in which another probe response is transmitted at an increased power level. If this power level is sufficient to trigger an acknowledgment from client station 2a, step S8 stores the value n of the repetition counter in association to the identifier information i of client station 2a.

If no acknowledgement is received by access point 1 and if the repetition counter has reached nmax, in step S6, which may reflect the fact that the most recent probe response has been transmitted at the highest power that the access point 1 can provide, the access point stores a data pair i, n+x in step S9. The value of x should preferably be at least 1 in order to allow a distinction between cases in which an acknowledgement was received after at least nmax attempts and those in which it was not. Values of x larger that 1 may be useful in order to prevent the access point 1 from starting network operation in a channel where communication with one of the client stations has failed.

Figure 4:
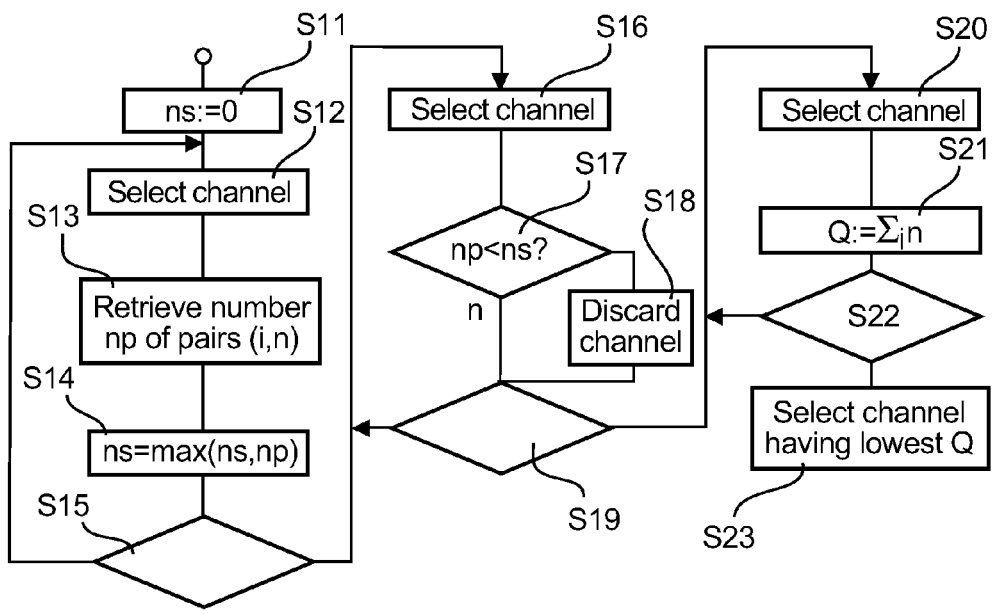
FIG. 4 is a flowchart of a method for selecting a transmission channel based on data collected using the method of FIG. 3.

When the method of FIG. 3 has been carried out for each of the channels supported by access point 1 and each client station 2a to 2d within the range 3 of access point 1, there is stored in access point 1, associated to each channel, a list of pairs (i, n) indicating, for each client station i, the number n of probe responses transmitted on said channel. The number of such pairs may differ from one channel to the other, since a channel may be so heavily disturbed that, although a client station may be broadcasting probe requests on the channel, the access point 1 does not receive them. This fact is taken account of in a first stage of the channel selection method described referring to FIG. 4. In the initial step S11 of this method, a client station count ns is set to zero. Next, access point 1 selects one of the transmission channels supported by it, step S12, retrieves the list of data pairs (i, n) associated to this channel, step S13, and determines the number np of such pairs in the list. In step S14, ns is set equal to np if np is higher than ns, else ns is left unchanged. If in S15, there is a channel left unselected, the process returns to S12. So, when steps S13, S14 have been carried out for all channels, ns is the maximum number of client stations the access point 1 can communicate with on any given channel, and should ideally be equal to the number of client stations 2a-2d within range 3.

In step S16, the access point again selects a channel and compares the number of pairs np associated to this channel to the number ns in step S17. If np<ns, the channel is discarded in step S18, i.e. it is labelled as non-eligible for network operation, because there is at least one client station which cannot communicate by this channel. As long as not all channels have been checked in this way, the process returns from S19 to S16; else it continues to S20 in which, again, a channel is selected. Step S21 calculates a sum Q of the repeat counts n over all client stations i for the selected channel. Again, steps S20, S21 are repeated until they have been executed for all channels. Finally, the channel having the lowest value of Q is selected for operating the network in step S23. It is readily apparent that by setting x to a large positive value, a strong bias can be generated against selection of a channel in which transmission of the probe response to a client station has failed.

The need to change the channel by which access point 1 and its associated client stations 2a to 2d communicate may arise also while their network is operating, e.g. to due the displacements of the client stations or due to varying levels of noise from other sources. In principle, the method described above is applicable in such a situation, too, for finding out whether there is a channel that provides a better transmission quality than the channel the network is currently using. If, in such a situation, the access point 1 responded to a probe request from a client station by a probe response at a low power level and comprising the SSID of access point 1, detection of such a message by a client station carrying out an active scan would cause this client station to assume that conditions for communication with access point 1 are bad, and might induce it to associate to another access point, e.g. access point 4 of FIG. 1, although the client station is actually closer to access point 1 than to access point 4.

In order to avoid such an effect, according to a preferred embodiment of the invention, access point 1 uses two identities, a standard SSID and an alias SSID. The standard SSID is used for all messages transmitted by access point 1 except those probe responses that are transmitted in step S4 of FIG. 3 at a power level less than the maximum rated transmission power of access point 1. In this way, any station that is performing an active scan will receive messages from access point 1 comprising its standard SSID at maximum rated power and, hence, with the best signal-noise ration the access point 1 can provide, whereas probe response messages containing the alias SSID will be received at an inferior quality. Accordingly, based on the signal levels it receives, the client station will conclude that the access point identified the standard SSID has a powerful signal and is worthwhile associating with, whereas the access point that uses the alias SSID has a mediocre signal quality and should rather not be associated with.

Nevertheless, it cannot be totally excluded that a client station issues a request for association to the alias SSID. Such a request will be received by access point 1, but since it is not directed to the proper SSID, the access point 1 will not grant association so that in a further attempt the client station will send an association request to the standard SSID, which may then be granted.

Also other embodiments of the invention may be utilized by one skilled in the art without departing from the scope of the present invention. The wireless network is in particular a network in accordance with one of the IEEE 802.11 standards, but also any other wireless networks may be tested with the method. The invention resides therefore in the claims herein after appended.

The invention claimed is:

1. A method for assessing quality of a set of transmission channels in a wireless network, the method comprising:
   a) transmitting, by a first station, a first unicast message to a second station in a first of said transmission channels;
   b) if no acknowledgement of the first unicast message is received from the second station, transmitting, by the first station, a further unicast message at a higher power level in said first transmission channel;
   c) if an acknowledgment of the first or any further unicast message is received from the second station, determining, by the first station, the power level or the number of unicast messages that were needed to trigger the acknowledgment for said first transmission channel;
   d) carrying out a) to c) for each further transmission channel of the set of transmission channels;
   e) identifying, by the first station, the transmission channel that scores a best quality according to c);
   f) transmitting, by the first station, at least one message to said second station to use the transmission channel as identified in e) for the wireless network; and
   g) including, by the first station, alias station identifier information in the first unicast message that is different from standard station identifier information included in the at least one message sent in f).

2. The method of claim 1, wherein the wireless network is an IEEE 802.11 network.

3. The method of claim 2, wherein the first and any further unicast messages are probe response messages.

4. The method of claim 3, wherein a) is triggered by the second station transmitting a probe request message.

5. The method of claim 2, wherein the first station is an access point of the IEEE 802.11 network.

6. The method of claim 1, wherein b) is triggered by a timeout generated in the first station.

7. The method of claim 1, wherein the power level at which the first unicast message is transmitted in a) is less than the power level at which messages are transmitted in f).

8. The method of claim 1, wherein a) to c) are repeated for all transmission channels after f) has been carried out.

9. The method of claim 1, wherein the network comprises a plurality of second stations, a) to c) are carried out for each one of said second stations, and the quality of each transmission channel is assessed further depending on the number of said second stations having communicated with the first station by said transmission channel.

10. The method of claim 1, wherein the first station rejects association requests directed to a station identified by the alias station identifier information.

11. A method for assessing quality of a set of transmission channels in a wireless network, the method comprising:
   a) transmitting, by a first station, a first unicast message to a second station in a first of said transmission channels;
   b) generating, by the first station, a timeout in the first station after a delay and, if no acknowledgement of the first unicast message is received by the first station from the second station, transmitting, by the first station, a further unicast message at a higher power level until a number of transmissions is reached, wherein a most recent unicast message is the unicast message being transmitted at a highest power level and the highest power level is the maximum power that the first station can provide;
   c) if an acknowledgment of the first or any further unicast message is received by the first station from the second station, assessing, by the first station, quality of the first transmission channel based on the power level or the number of re-transmissions that were needed to trigger the acknowledgment; and
   d) if no acknowledgement of a unicast message is received by the first station from the second station for the highest power level, adding, by the first station, a value of at least 1 to a number of maximum transmissions, in order to allow a distinction between transmission channels for which the acknowledgement was received and for those transmission channels for which the acknowledgement was not received.

12. The method of claim 11, wherein the wireless network is an IEEE 802.11 network.

13. The method of claim 12, wherein the first and any further unicast messages are probe response messages.

14. The method of claim 13, wherein a) is triggered by the second station transmitting a probe request message.

15. The method of claim 12, wherein the first station is an access point of the IEEE 802.11 network.

16. The method of claim 11, wherein b) is triggered by the timeout generated in the first station.

* * * * *